(12) United States Patent
Wang et al.

(10) Patent No.: US 8,559,423 B2
(45) Date of Patent: Oct. 15, 2013

(54) METHOD AND APPARATUS FOR PACKET PROCESSING

(75) Inventors: Ju Wang, Beijing (CN); Zhanming Wei, Beijing (CN); Xudong Zou, Beijing (CN); Xiao Li, Beijing (CN); Xiangqing Chang, Beijing (CN)

(73) Assignee: Hangzhou H3C Technologies Co., Ltd., Hangzhou, Zhejiang Province (CN)

( * ) Notice: Subject to any disclaimer, the term of this patent is extended or adjusted under 35 U.S.C. 154(b) by 843 days.

(21) Appl. No.: 12/670,766

(22) PCT Filed: Jun. 26, 2008

(86) PCT No.: PCT/CN2008/071452
§ 371 (c)(1),
(2), (4) Date: Jan. 26, 2010

(87) PCT Pub. No.: WO2009/015570
PCT Pub. Date: Feb. 5, 2009

(65) Prior Publication Data
US 2010/0195647 A1    Aug. 5, 2010

(30) Foreign Application Priority Data

Jul. 27, 2007  (CN) .......................... 2007 1 0119659
Jul. 27, 2007  (CN) .......................... 2007 1 0119660
Jan. 18, 2008  (CN) .......................... 2008 1 0004126

(51) Int. Cl.
*H04L 12/58* (2006.01)
(52) U.S. Cl.
USPC .......................................... 370/389; 709/227
(58) Field of Classification Search
None
See application file for complete search history.

(56) References Cited

U.S. PATENT DOCUMENTS

| 6,567,377 | B1  |   | 5/2003  | Vepa et al. |
|---|---|---|---|---|
| 7,254,639 | B1 | * | 8/2007 | Siegel et al. .................. 709/238 |
| 7,672,236 | B1 | * | 3/2010 | Karunakaran et al. ..... 370/230.1 |
| 2002/0143955 | A1 | * | 10/2002 | Shimada et al. ............. 709/227 |
| 2003/0200315 | A1 |   | 10/2003 | Goldenberg et al. |
| 2005/0074017 | A1 | * | 4/2005 | Qian et al. .................... 370/401 |
| 2005/0135376 | A1 | * | 6/2005 | Bae et al. ................... 370/395.2 |
| 2008/0089327 | A1 | * | 4/2008 | Lu et al. ....................... 370/389 |

FOREIGN PATENT DOCUMENTS

| CN | 1567841 A | 1/2005 |
|---|---|---|
| CN | 1610335 A | 4/2005 |
| CN | 1783796 A | 6/2006 |
| CN | 1812398 A | 8/2006 |
| CN | 1838592 A | 9/2006 |

(Continued)

OTHER PUBLICATIONS

International Search Report: PCT/CN2008/071452.

*Primary Examiner* — Brian Roberts
(74) *Attorney, Agent, or Firm* — Ladas & Parry LLP

(57) ABSTRACT

The present invention discloses a packet processing apparatus and method. The packet processing apparatus is applied to an L4~L7 network device, including a plurality of interface processing units and a plurality of service processing units, the interface processing units are connected with the service processing units through a first connection unit; and each of the interface processing units is adapted to select, after receiving a packet from outside, a service processing unit from all the service processing units and transmit the packet to the selected service processing unit; and each of the service processing units is adapted to perform service processing to the packet after receiving the packet. The present invention improves packet processing capability and reliability of the L4~L7 network device.

11 Claims, 12 Drawing Sheets

(56) References Cited

FOREIGN PATENT DOCUMENTS

| | | |
|---|---|---|
| CN | 1838609 A | 9/2006 |
| CN | 1909507 A | 2/2007 |
| CN | 1917521 A | 2/2007 |
| CN | 1921457 A | 2/2007 |
| CN | 101094184 A | 12/2007 |
| CN | 101106526 A | 1/2008 |
| WO | 2006/031659 A2 | 3/2006 |

* cited by examiner

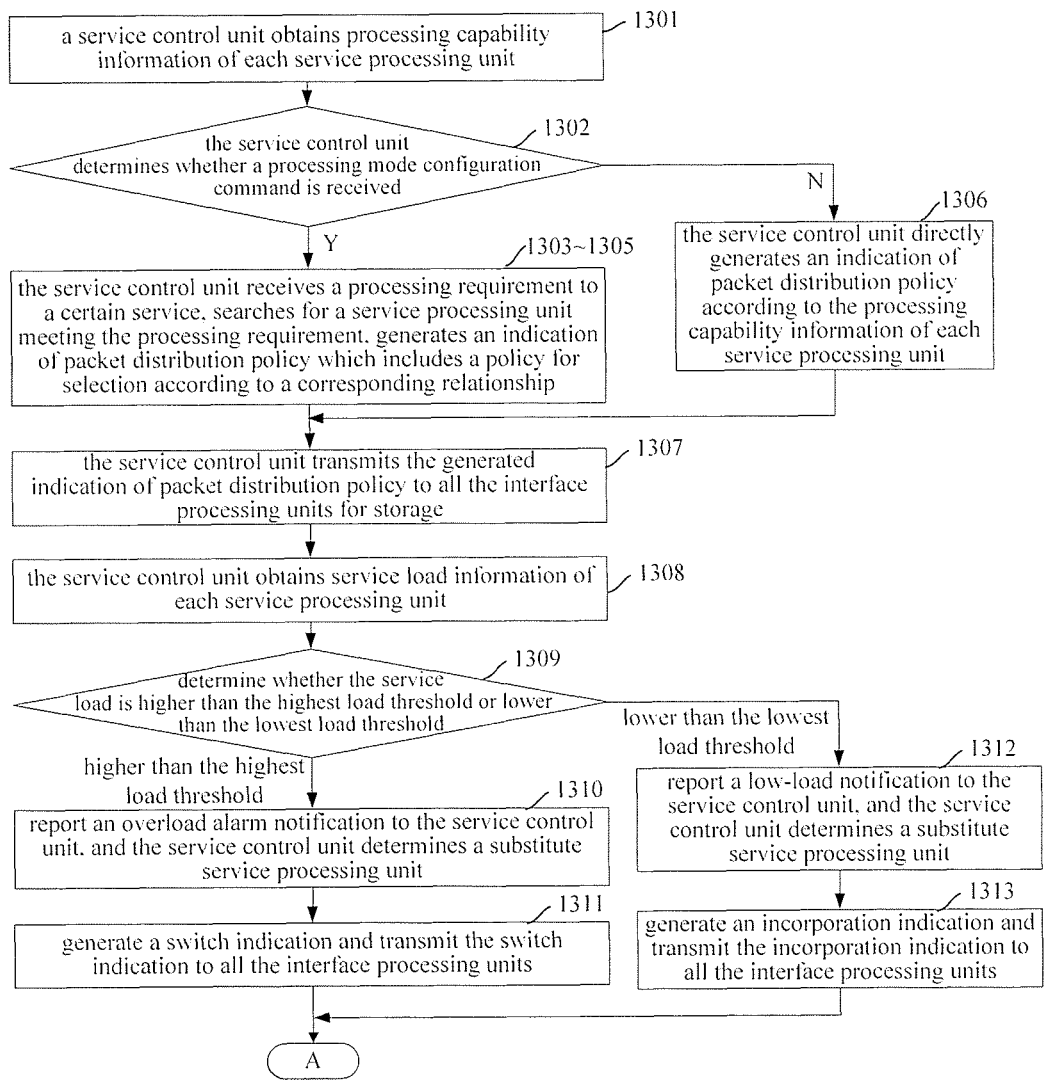
The first part of Fig.13

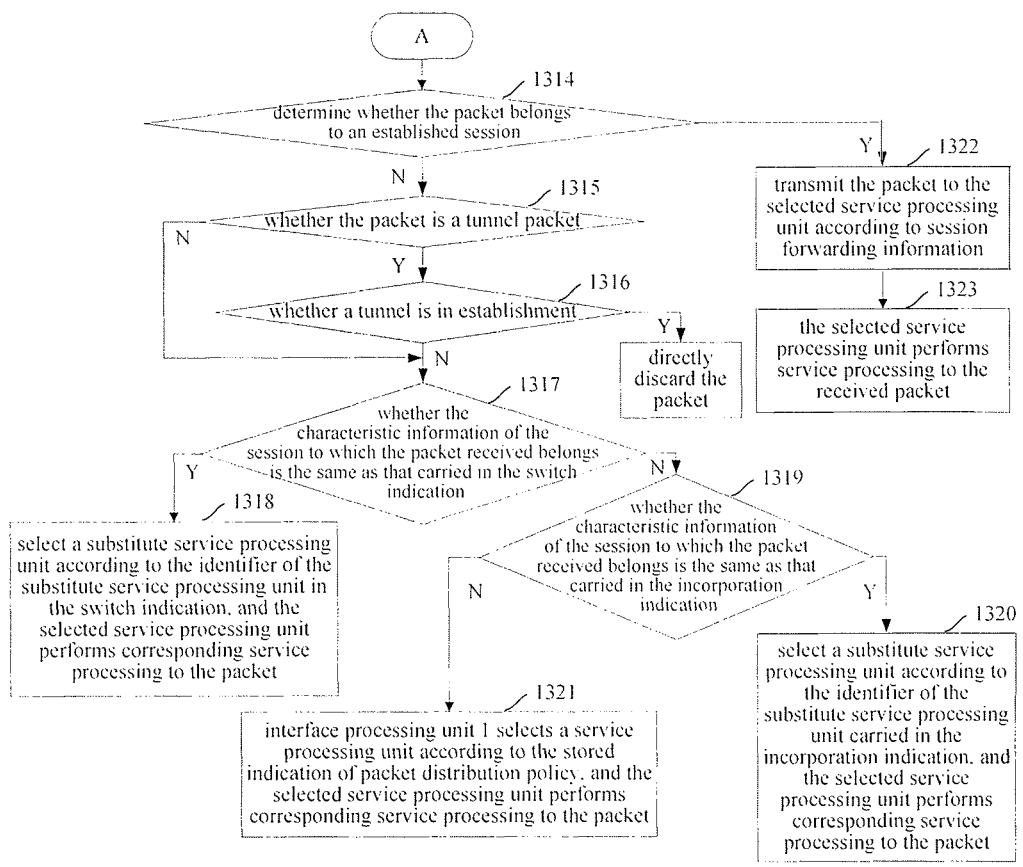
The second part of Fig.13

METHOD AND APPARATUS FOR PACKET PROCESSING

FIELD OF THE INVENTION

The present invention relates to network communication techniques, and more particularly, to a method and apparatus for packet processing.

BACKGROUND OF THE INVENTION

In a network, in order to enable a network device on layer 4 to layer 7 (hereinafter referred to as a L4~L7 network device for simplicity) to perform various service processing to packets of a service stream, i.e. a session, a typical switch architecture inside the L4~L7 network device is provided, which mainly includes a service control unit, a service processing unit and an interface.

FIG. 1 is a schematic diagram illustrating an internal structure of a L4~L7 network device according to the prior art. As shown in FIG. 1, the typical switch architecture inside the L4~L7 network device is presently as follows: in the L4~L7 network device, an interface is connected with a service processing unit fixedly, and all the service processing units are connected with a service control unit through a connection unit. After receiving a packet, an interface, e.g. interface 1, of the L4~L7 network device transmits the packet to service processing unit 1 which is fixedly connected with interface 1. After receiving the packet from interface 1, service processing unit 1 transmits the packet to the service control unit, if determining that the packet belongs to an unestablished session, i.e. the packet is a first packet of a session, and the service control unit will accomplish various session control processing including establishing a new session and a TCP half connection. Then, the service control unit transmits information about the session and session processing actions to service processing unit 1 through the connection unit, and service processing unit 1 performs corresponding service processing to packets according to the received information about the session and session processing actions. After receiving the packet from interface 1, service processing unit 1 will directly perform, if determining that the packet belongs to an established session, corresponding service processing to the packet according to stored session information and session processing actions.

It can be seen from the above description and FIG. 1 that, in the prior art, an interface and a service processing unit of the L4~L7 network device are bound with each other, i.e. one service processing unit is fixedly connected with one interface. As such, each service processing unit can process only packets of the interface bound with it. If some interfaces of the L4~L7 network device have a large traffic amount whereas others have a little traffic amount, service processing units corresponding to the interfaces with a large traffic amount will have a heavy load. Under this circumstance, the packet processing speed will decrease and a bottle neck appears. Other service processing units, however, are in idle state, which dramatically decreases the packet processing capability of the L4~L7 network device.

In the prior art, if one service processing unit of the L4~L7 network device fails, all services processed by the service processing unit are interrupted, which dramatically decreases the service quality of the L4~L7 network device.

Furthermore, in the prior art, since the interface and the service processing unit are bound with each other, and the service processing capability rests on performance of a single service processing unit, it is impossible to provide high-speed speed-limited service processing port (e.g. 10GE port). Also, in the prior art, the service control unit processes packets centrally, which may cause a bottleneck on the processing capability, and it is hard to extend.

SUMMARY OF THE INVENTION

Embodiments of the present invention provide a packet processing method and apparatus, so as to enhance packet processing capability of an L4~L7 network device.

According to an embodiment of the present invention, a packet processing apparatus is provided. The apparatus is applied in an L4~L7 network device, including:

a plurality of interface processing units and a plurality of service processing units, the interface processing units are connected with the service processing units through a first connection unit; and each of the interface processing units is adapted to select, after receiving a packet from outside, a service processing unit from all the service processing units and transmit the packet to the selected service processing unit through the first connection unit; and each of the service processing units is adapted to perform service processing to the packet after receiving the packet.

According to another embodiment of the present invention, a packet processing method is provided. The method includes:

configuring a connection unit between interface processing units and service processing units in an L4~L7 network device;

after receiving a packet from outside, selecting, by one of the interface processing units, a service processing unit, and transmitting the packet to the selected service processing unit through the connection unit; and performing, by the selected service processing unit, service processing to the packet after receiving the packet.

It can be seen that, in the embodiments of the present invention, interfaces and service processing units in the L4~L7 network device are no longer bound with each other. A packet received by an interface processing unit may be allocated to any service processing unit. As such, the service processing units in the L4~L7 network device can be flexibly used, which improves the packet processing capability and the reliability of the L4~L7 network device.

Furthermore, in the embodiments of the present invention, an interface processing unit may randomly select a service processing unit. Thus, if one service processing unit in the L4~L7 network device fails, all services processed by this service processing unit may be transferred to other normal service processing units for processing, which dramatically improves the service quality of the L4~L7 network device.

In addition, in the embodiments of the present invention, the service processing units also have a function of reporting service loads of themselves. Thus, in case that one service processing unit is overload, the session processed by this service processing unit may be dynamically transferred to a substitute service processing unit. Moreover, in case that the load of a service processing unit is too low, the session processed by this service processing unit may be incorporated with that of a substitute service processing unit, so as to enable the service control unit to adjust services processed by all the service processing units in real time. As such, the flexibility and controllability for implementing services are greatly enhanced.

Furthermore, in the embodiments of the present invention, besides an original first level pre-processing module, a second level pre-processing module is added into the L4~L7 network device. The second level pre-processing module takes charge of complicated processing for special streams previously managed by the first level pre-processing module. Therefore, the first level pre-processing module only needs to perform general processing for common streams, which ensures the simplicity and rapidness of the processing of the first level pre-processing module and greatly improves the processing capability of the L4~L7 network device.

BRIEF DESCRIPTION OF DRAWINGS

FIG. 13 is a flowchart illustrating a packet processing procedure according to an embodiment of the present invention.

DETAILED DESCRIPTION OF THE INVENTION

The present invention will be described hereinafter in detail with reference to accompanying drawings and embodiments to make the technical solution and merits therein clearer.

In practical service implementations, as to any type of service, e.g. video session, it can be processed by most or even all service processing units in an L4~L7 network device. Therefore, after an interface receives a packet with a service type, it is not necessary to select a fixed service processing unit to process the packet as in the prior art. It is quite possible to flexibly select a service processing unit to process the packet, so as to dramatically improve the packet processing capability of the L4~L7 network device.

Figure 1:
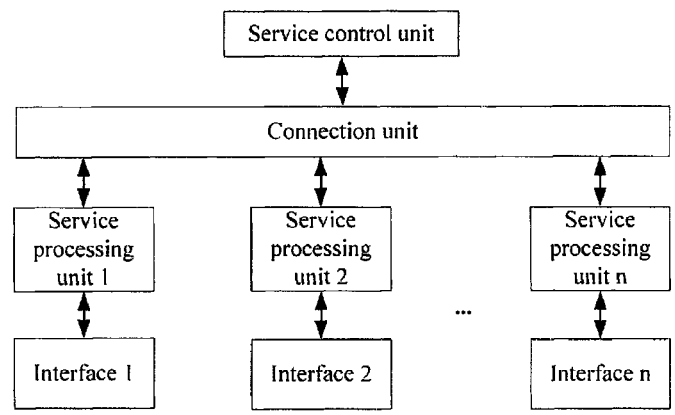
FIG. 1 is a schematic diagram illustrating an internal structure of an L4~L7 network device according to the prior art.
Figure 2:
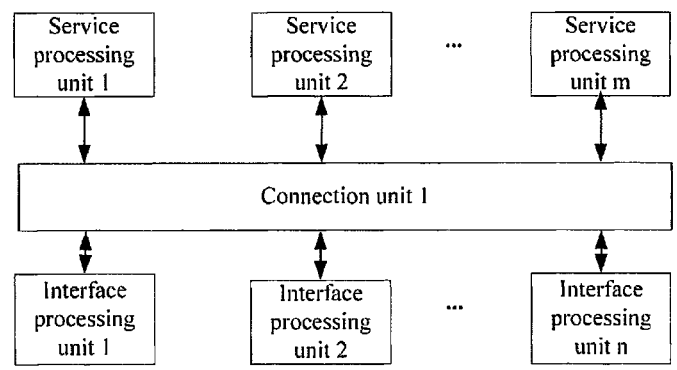
FIG. 2 is a schematic diagram illustrating an internal structure of a packet processing apparatus according to an embodiment of the present invention.

Therefore, embodiments of the present invention provide a packet processing apparatus applicable for the L4~L7 network device. FIG. 2 is a schematic diagram illustrating an internal structure of a packet processing apparatus according to an embodiment of the present invention. As shown in FIG. 2, the packet processing apparatus mainly includes: a plurality of interface processing units and a plurality of service processing units, each interface processing unit communicates with each service processing unit through connection unit 1; and each of the interface processing units is adapted to select, after receiving a packet from outside, a service processing unit from all the service processing units, and transmit the packet to the selected service processing unit through connection unit 1; and each of the service processing units is adapted to perform service processing to the packet after receiving the packet.

All the functional units of the packet processing apparatus shown in FIG. 2 may be set in one L4~L7 network device, i.e., all the interface processing units and all the service processing units are located in the same L4~L7 network device. As such, in the L4~L7 network device, the interface processing units and the service processing units are not bound with each other any more. A packet from an interface processing unit may be allocated to any service processing unit, which enables the L4~L7 network device to flexibly utilize each packet processing unit, thereby improving the packet processing capability of the L4~L7 network device.

The functional units in the packet processing apparatus shown in FIG. 2 may also be set in different L4~L7 network devices. For example, some interface processing units may be set in L4~L7 network device 1, others are set in L4~L7 network device 2, and some service processing units are set in L4~L7 network device 1 while others are set in L4~L7 network device 2. As such, besides being allocated to any service processing unit in the same L4~L7 network device, a packet from an interface processing unit of one L4~L7 network device may be allocated to any service processing unit of another L4~L7 network device. Therefore, an L4~L7 network device can flexibly utilize not only the service processing units of itself but also the service processing units of other L4~L7 network devices, which dramatically improves the packet processing capability of the L4~L7 network device.

Based on the basic structure shown in FIG. 2, the packet processing apparatus may further include a service control unit, adapted to implement various session control processing such as session establishment and TCP half connection.

Figure 3:
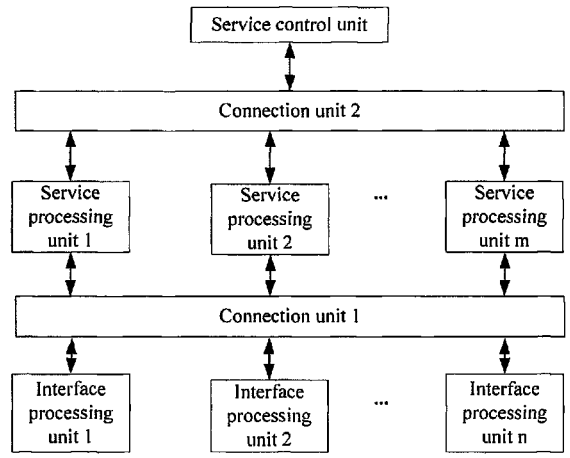
FIG. 3 is a schematic diagram illustrating a first preferred internal structure of a packet processing apparatus according to an embodiment of the present invention.

FIG. 3 is a schematic diagram illustrating a first preferred structure of the packet processing apparatus according to an embodiment of the present invention. As shown in FIG. 3, a first solution for adding the service control unit to the service processing apparatus is as follows: connect the service processing units and the service control unit according to a connection manner in the prior art, i.e., all the service processing units connect to the service control unit through a connection unit, hereinafter referred to as connection unit 2.

Then, each of the service processing units is adapted to determine, after receiving a packet from an interface processing unit, whether the packet belongs to an established session, transmit the packet to the service control unit through connection unit 2 if the packet does not belong to an established session, and perform service processing to the packet according to stored session information and session processing actions if the packet belongs to an established session.

The service control unit is adapted to perform establishment processing for the session to which the packet belongs after receiving the packet and select a service processing unit. Herein, the service control unit may select the service processing unit from which the packet is transmitted or select a service processing unit for processing the packet according to a pre-defined relocation policy. Afterwards, the service control unit transmits the session information and session processing actions to the selected service processing unit through connection unit 2. Thus, the service processing unit selected by the service control unit is able to perform corresponding service processing to the first packet of the session according to the received session information and session processing actions.

Figure 4:
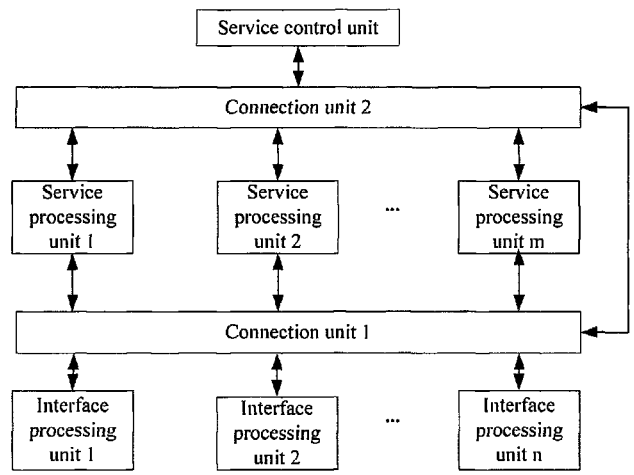
FIG. 4 is a schematic diagram illustrating a second preferred internal structure of a packet processing apparatus according to an embodiment of the present invention.

FIG. 4 is a schematic diagram illustrating a second preferred structure of a packet processing apparatus according to an embodiment of the present invention. As shown in FIG. 4, the second solution for adding the service control unit to the packet processing apparatus is as follows: connect all the service processing units with the service control unit through a connection unit, hereinafter referred to as connection unit 2, and connection unit 2 is connected with connection unit 1. Since connection unit 1 is connected with connection unit 2, as to a first packet of a session, the interface processing unit may directly transmit the first packet to the service control unit. The method that the service processing unit forwards the first packet to the service control unit adopted in the apparatus shown in FIG. 3 is not required any more, which increases the packet processing efficiency. The detailed process of the interface processing unit directly transmitting the first packet of a session to the service control unit includes:

after receiving the packet, the interface processing unit determines whether the packet belongs to an established session, if the packet does not belong to an established session, transmit the packet to the service control unit through connection unit 1 and connection unit 2, if the packet belongs to an established session, select a service processing unit to trigger the selected service processing unit to perform corresponding service processing to the packet; and after receiving the packet, the service control unit performs establishment processing for the session to which the packet belongs, selects a service processing unit, and transmits session information and session processing actions to the selected service processing unit through connection unit 2 to trigger the selected service processing unit to perform corresponding service processing to the packet.

Figure 5:
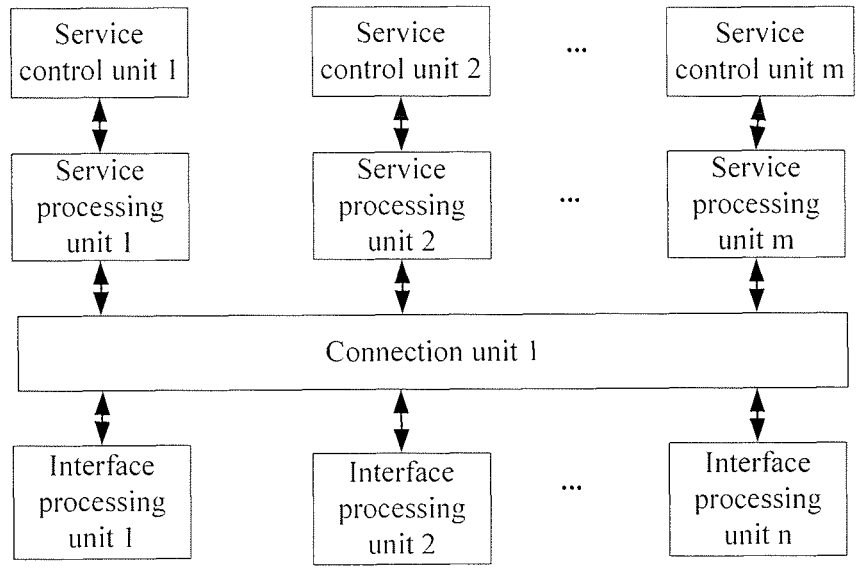
FIG. 5 is a schematic diagram illustrating a third preferred internal structure of a packet processing apparatus according to an embodiment of the present invention.

FIG. 5 is a schematic diagram illustrating a third preferred structure of a packet processing apparatus according to an embodiment of the present invention. As shown in FIG. 5, the third solution for adding the service control unit to the packet processing apparatus is as follows: fixedly connect each service processing unit with one service control unit, i.e., each service processing unit has a dedicate service control unit providing control for it. The detailed implementation includes:

each of the service processing units is adapted to determine, after receiving a packet from the interface processing unit, whether the packet belongs to an established session, transmit the packet to the service control unit fixedly connected with the service processing unit if the packet does not belong to an established session, and perform service processing to the packet according to stored session information and session processing actions if the packet belongs to an established session;

each of the session control units is adapted to perform, after receiving the packet, establishment processing for the session to which the packet belongs, transmit the session information and the session processing actions to the service processing unit fixedly connected with the session control unit to trigger the service processing unit to perform corresponding service processing to the packet.

Figure 6:
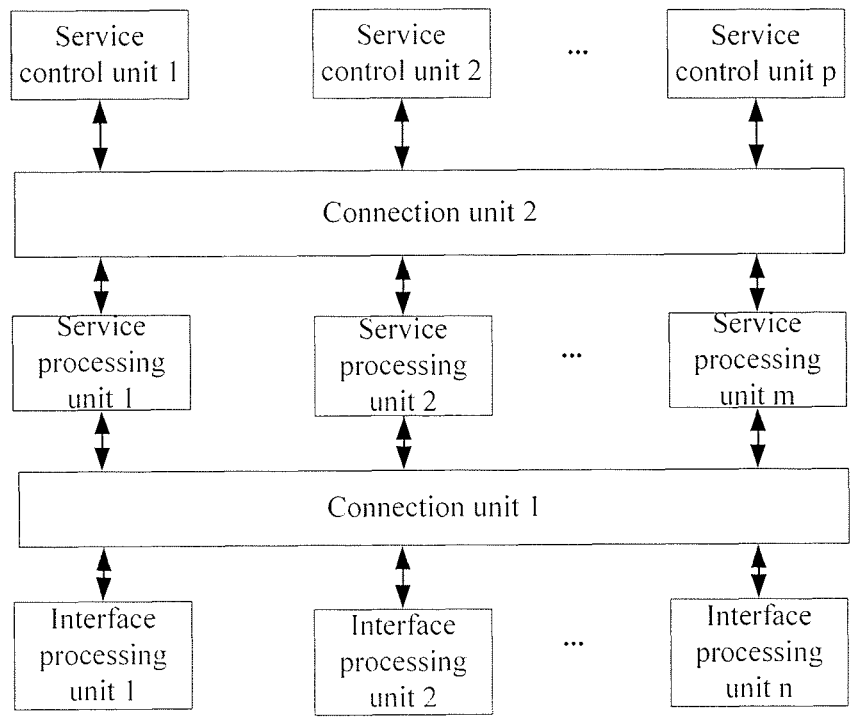
FIG. 6 is a schematic diagram illustrating a fourth preferred internal structure of a packet processing apparatus according to an embodiment of the present invention.

FIG. 6 is a schematic diagram illustrating a fourth preferred structure of a packet processing apparatus according to an embodiment of the present invention. As shown in FIG. 6, the fourth solution for adding the service control unit to the packet processing apparatus is as follows: connect all the service processing units with a plurality of service control units through connection unit 2, i.e., the plurality of service control units are responsible for providing services for all the service processing units.

The detailed implementation includes:

each of the service processing units is adapted to determine, after receiving a packet, whether the packet belongs to an established session, select a service control unit if the packet does not belong to an established session, transmit the packet to the selected service control unit through connection unit 2, and perform service processing to the packet according to stored session information and session processing actions if the packet belongs to an established session;

each of the service control units is adapted to perform establishment processing for the session to which the packet belongs after receiving the packet, transmit through connection unit 2 the session information and session processing actions to the service processing unit from which the packet is received; or, select a service processing unit, and transmit the session information, session processing actions and the packet to the service processing unit selected by the service control unit through connection unit 2.

Figure 7:
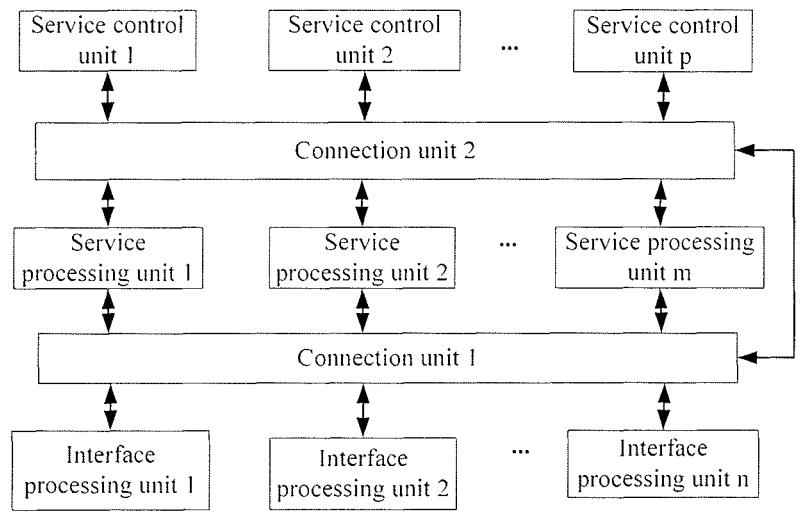
FIG. 7 is a schematic diagram illustrating a fifth preferred internal structure of a packet processing apparatus according to an embodiment of the present invention.
Figure 8:
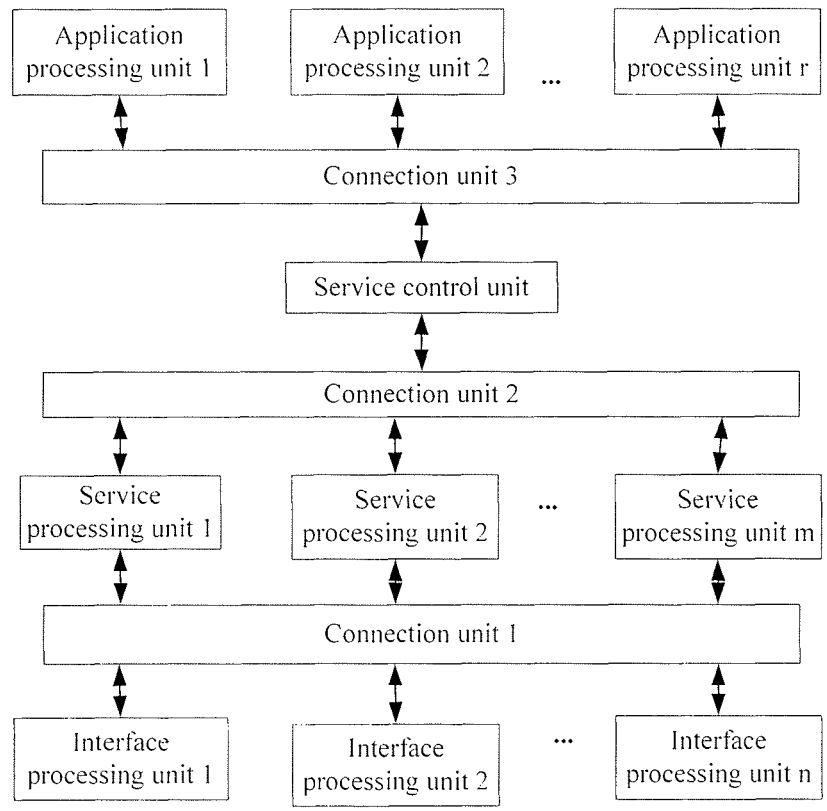
FIG. 8 is a schematic diagram illustrating a structure wherein application processing units are added to the packet processing apparatus shown in FIG. 3.
Figure 9:
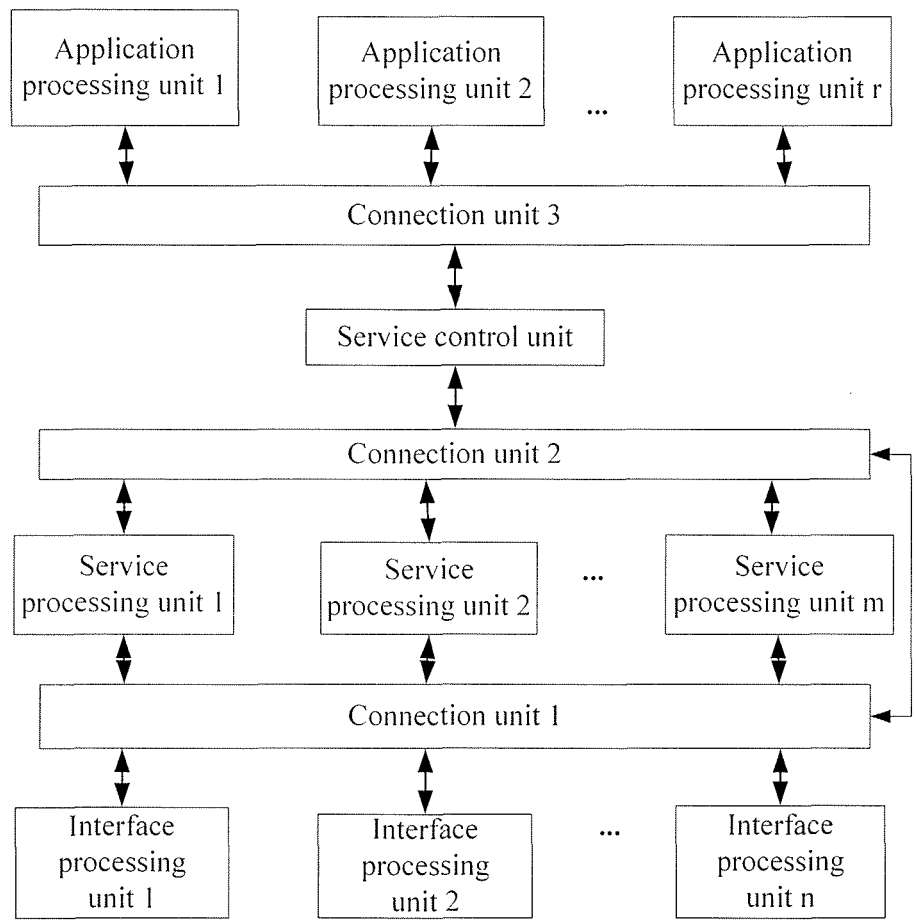
FIG. 9 is a schematic diagram illustrating a structure wherein application processing units are added to the packet processing apparatus shown in FIG. 4.
Figure 10:
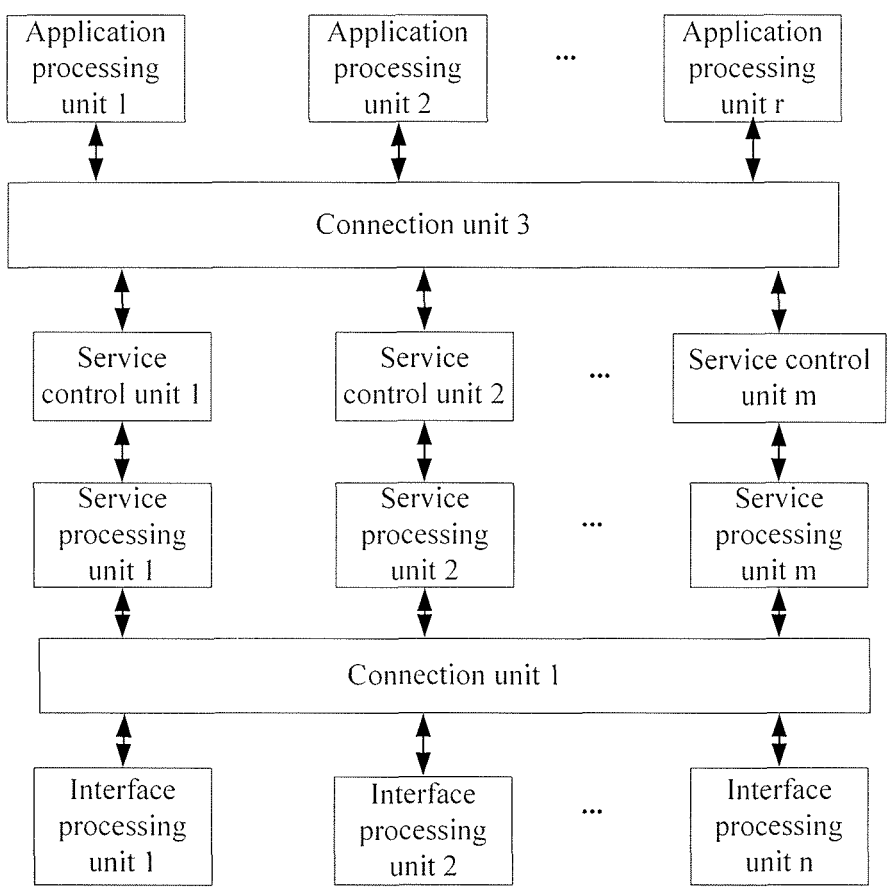
FIG. 10 is a schematic diagram illustrating a structure wherein application processing units are added to the packet processing apparatus shown in FIG. 5.
Figure 11:
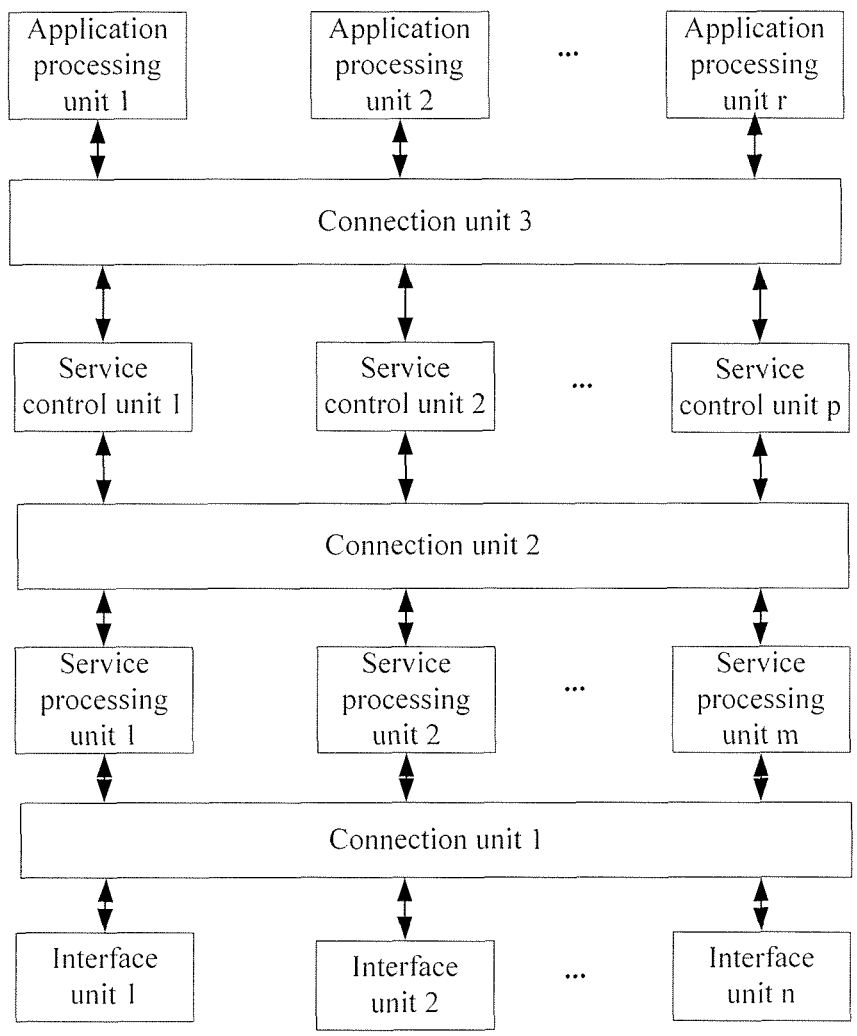
FIG. 11 is a schematic diagram illustrating a structure wherein application processing units are added to the packet processing apparatus shown in FIG. 6.
Figure 12:
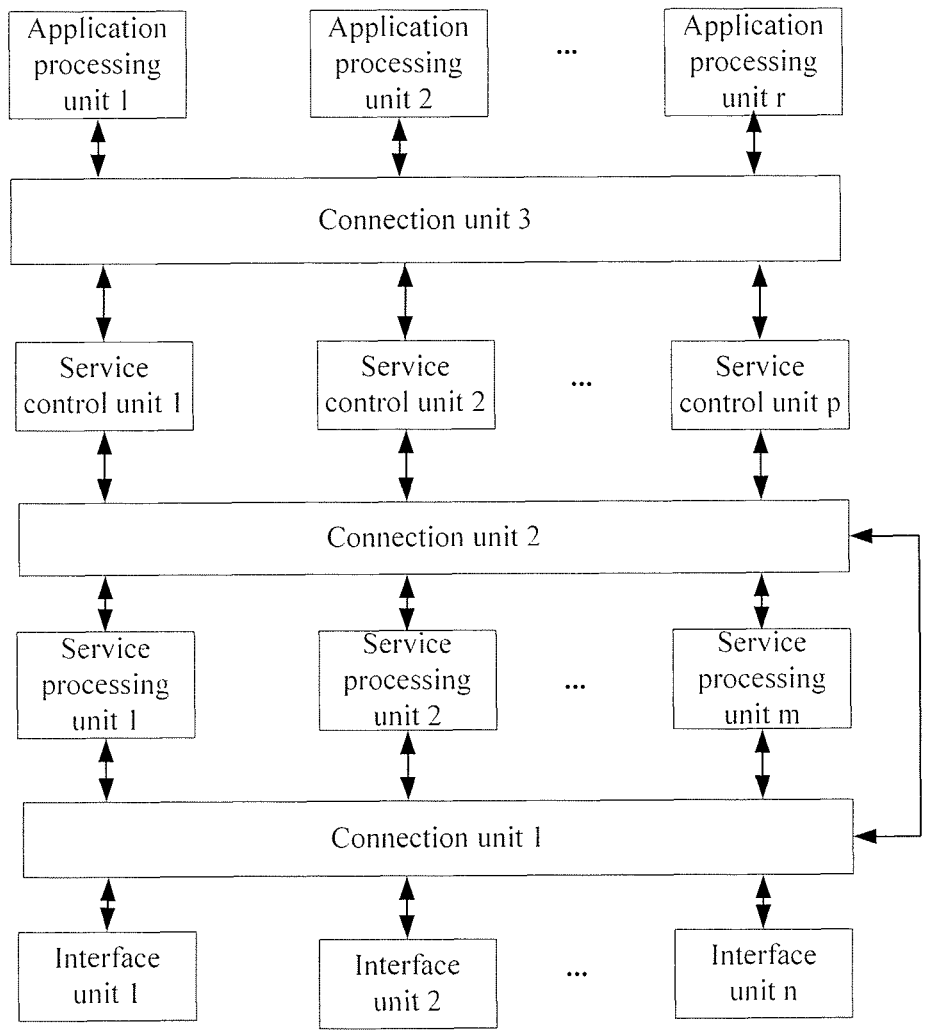
FIG. 12 is a schematic diagram illustrating a structure wherein application processing units are added to the packet processing apparatus shown in FIG. 7.

FIG. 7 is a schematic diagram illustrating a fifth preferred structure of a packet processing apparatus according to an embodiment of the present invention. As shown in FIG. 7, the fifth solution for adding the service control unit to the packet processing apparatus is as follows: connect all the service processing units with a plurality of service control units through connection unit 2, and connection unit 2 is connected with connection unit 1. Since connection unit 2 is connected with connection unit 1, the interface processing unit may directly transmit a first packet of a session to the service control unit. The method that the service processing unit forwards the first packet to the service control unit adopted in the apparatus shown in FIG. 6 is not required any more, which improves the packet processing efficiency. The detailed implementation includes:

each of the interface processing units is adapted to determine, after receiving a packet, whether the packet belongs to an established session, select a service control unit and directly transmit the packet to the selected service control unit through connection unit 1 and connection unit 2 if the packet does not belong to an established session, select a service processing unit and trigger the selected service processing unit to perform service processing to the packet if the packet belongs to an established session;

each of the service control units is adapted to perform establishment processing for the session to which the packet belongs after receiving the packet, select a service processing unit, and transmit the session information and the session processing actions to the selected service processing unit through connection unit 2 to trigger the selected service processing unit to perform corresponding service processing to the packet.

It can be seen that, compared with the packet processing apparatuses shown in FIG. 3 and FIG. 4, a dedicated service control unit is utilized in FIG. 5 for controlling a corresponding service processing unit, and a plurality of service control units are used in FIG. 6 and FIG. 7 for controlling the operations of all the service processing units. Therefore, the packet processing apparatuses shown in FIG. 5, FIG. 6 and FIG. 7 have higher session establishment speeds, which further improves the packet processing capability of the L4~L7 network device and also avoids the deficiency that all services will be interrupted due to a service control unit's failure in the packet processing apparatuses shown in FIG. 3 and FIG. 4.

It should be noted that all the functional units in each of the packet processing apparatuses shown in FIG. 3 to FIG. 7 may be set in one L4~L7 network device or in different L4~L7 network devices. In other words, all the service control units, the service processing units and the interface processing units may be set in one L4~L7 network device or in different L4~L7 network devices.

Each of the packet processing apparatuses shown in FIG. 5 to FIG. 7 includes a plurality of service control units. In one preferred embodiment of the present invention, the functional units in the packet processing apparatus may be set in different L4~L7 network devices. For example, some interface processing units may be set in L4~L7 network device 1 and others are set in L4~L7 network device 2; some service processing units may be set in L4~L7 network device 1 and others are set in L4~L7 network device 2; and some service control units are set in L4~L7 network device 1 and others are set in L4~L7 network device 2. As such, different L4~L7 network devices may cooperate with each other. That is to say, an interface processing unit in L4~L7 network device 1 may randomly select a service processing unit or a service control unit in L4~L7 network device 1 or in L4~L7 network device 2 to process a packet; and a service processing unit in L4~L7 network device 1 may randomly select a service control unit in L4~L7 network device 1 or L4~L7 network device 2 to process the packet; and a service control unit in L4~L7 network device 1 may select any service processing unit in L4~L7 network device 1 or L4~L7 network device 2 to process the packet. As such, the flexibility of the present invention is greatly increased and the packet processing capability of the L4~L7 network device is improved.

Similar to relevant processing in the prior art, the service control unit in the embodiments of the present invention also needs to transmit session forwarding information obtained during session establishment to the interface processing unit.

Refer to the packet processing apparatuses shown in FIG. 3, FIG. 5 and FIG. 6, there is no direct connection between the service control unit and the interface processing units. Therefore, the service control unit must forward the session forwarding information obtained during session establishment to the interface processing units through the service processing units. The detailed implementation includes:

the service control unit transmits the session forwarding information to the selected service processing unit;

the selected service processing unit transmits the session forwarding information to all the interface processing units; and each of the interface processing units stores the session forwarding information, and selects a service processing unit according to the stored session forwarding information after receiving a packet from outside and determining that the packet belongs to an established session.

Refer to the packet processing apparatuses shown in FIG. 4 and FIG. 7, the service control unit may be connected with the interface processing units through connection unit 1 and connection unit 2. Therefore, the service control unit may transmit the session forwarding information obtained during session establishment directly to the interface processing units. The detailed implementation includes:

the service control unit is further adapted to transmit the session forwarding information to all the interface processing units through connection unit 1 and connection unit 2;

each of the interface processing units, adapted to store the session forwarding information received, and select a service processing unit according to the stored session forwarding information after receiving a packet from outside and determining that the packet belongs to an established session.

The session forwarding information contains information of the service processing unit which processes the first packet of the session. Therefore, in the embodiments of the present invention, the interface processing unit selects the service processing unit according to the session forwarding information to ensure that all packets of the same session will be transmitted to the same service processing unit for processing.

In the packet processing apparatuses shown in FIG. 3 to FIG. 7, after determining the packet received does not belong to an established session, an interface processing unit may further determine whether the packet is a tunnel packet and whether the corresponding tunnel is in establishment. If the packet is a tunnel packet and the corresponding tunnel is in establishment, it indicates that the interface processing unit receives the packet during the establishment of the tunnel and before the establishment is finished. Therefore, the packet cannot be processed. The interface processing unit directly discards the packet. If the packet is not a tunnel packet, e.g. the packet is a UDP, TCP or ICMP packet, or the packet is a tunnel packet but the establishment of the tunnel has not been started yet, subsequent establishment processing of the session may be performed. Therefore, the interface processing unit may proceed further with the selection procedure to select a service control unit.

It should be noted that, the packet processing apparatuses shown in FIG. 3 to FIG. 7 may be used for implementing a Layer 4 L4~L7 network device. In order to realize higher layer L4~L7 network device, such as Layer 5~Layer 7 L4~L7 network device, application processing units may be introduced in the packet processing apparatuses shown in FIG. 3 to FIG. 7.

As to the packet processing apparatuses shown in FIG. 3, FIG. 4, FIG. 5, FIG. 6 and FIG. 7, a preferred structure of the packet processing apparatus added with the application processing units is respectively shown in FIG. 8, FIG. 9, FIG. 10, FIG. 11 and FIG. 12. All the service control units connect with a plurality of application processing units through a connection unit 3; wherein the service control unit, further adapted to determine, after receiving a packet, whether the packet requires application layer processing, select an application processing unit and transmit the packet to the selected application processing unit if the packet requires application layer processing, and perform establishment processing for the session to which the packet belongs if the packet does not require application layer processing; and the application processing unit, adapted to perform application layer processing to the packet after receiving the packet, select a service control unit and transmit the processed packet to the selected service control unit to trigger the selected service control unit to perform establishment processing for the session to which the packet belongs.

It should be noted that, in the packet processing apparatus shown in anyone of FIG. 8 to FIG. 12, all functional units may be set in one L4~L7 network device or in different L4~L7 network devices. In other words, all the application processing units, the service control units, the service processing units and the interface processing units may be set in the same L4~L7 network device or in different L4~L7 network devices.

In FIG. 5 to FIG. 7, each packet processing apparatus includes a plurality of service control units. In a preferred embodiment of the present invention, the functional units in the packet processing apparatus may be set in different L4~L7 network devices. For example, some interface processing units may be set in L4~L7 network device 1 and others are set in L4~L7 network device 2; some service processing units may be set in L4~L7 network device 1 and others are set in L4~L7 network device 2; and some service control units are set in L4~L7 network device 1 and others are set in L4~L7 network device 2. As such, different L4~L7 network devices may cooperate with each other. That is to say, an interface processing unit in L4~L7 network device 1 may randomly select a service processing unit or a service control unit in L4~L7 network device 1 or in L4~L7 network device 2 to process a packet; and a service processing unit in L4~L7 network device 1 may randomly select a service control unit in L4~L7 network device 1 or L4~L7 network device 2 to process the packet; and a service control unit in L4~L7 network device 1 may select any service processing unit in L4~L7 network device 1 or L4~L7 network device 2 to process the packet. As such, the flexibility of the present invention is greatly increased and the packet processing capability of the L4~L7 network device is improved.

Each of the packet processing apparatuses shown in FIG. 5 to FIG. 7 includes a plurality of service control units. Preferably, in order to improve the security and reliability of the packet processing apparatus, any two service control units in the packet processing apparatus may backup data to each other, i.e. a service control unit may backup its session control information to other service control units. And if one service control unit fails, another service control unit will substitute for the failed service control unit to perform session control processing. As such, when the plurality of service control units of the packet processing apparatus are set in one L4~L7 network device, backup among the service control units inside the L4~L7 network device may be realized. And when the plurality of service control units are in different L4~L7 network devices, backup among the service control units in different L4~L7 network devices is realized.

In the above embodiments of the present invention, when the functional units which directly interact with each other are in different network devices, the connection unit between the interacted functional units actually includes different connection unit parts in different network devices. And the interaction is realized through the different connection unit parts in different network devices. For example, after receiving a packet, interface processing unit 1 in L4~L7 network device 1 selects to transmit the packet to service processing unit 1 in L4~L7 network device 2. Thus, interface processing unit 1 transmits the packet to the connection unit in the L4~L7 network device 2 through the connection unit in L4~L7 network device 1, and the connection unit in the L4~L7 network device 2 transmits the packet to service processing unit 1.

It should be noted that, in the embodiments of the present invention, one functional unit in the packet processing apparatus may select another functional unit according to a per-configured policy. For example, when a service processing unit selects a service control unit or a service control unit selects an application processing unit, a pre-configured polling policy may be used to select each service control unit or each application processing unit in turn. Or, a pre-configured load-balancing policy may be used to select a service control unit or an application processing unit which has a lowest load. For another example, an interface processing unit may select a service processing unit according to an indication of packet distribution policy obtained by the interface processing unit. The indication of packet distribution policy obtained by the interface processing unit may be an indication transmitted from the service control unit which indicates to select according to a corresponding relationship between a certain service and service processing unit searched out. Thus, the interface processing unit may directly select a service processing unit according to the corresponding relationship. The indication of packet distribution policy obtained by the interface processing unit may also be any policy transmitted from the service control unit including service type information of each service processing unit, and anyone of polling policy, random allocation policy, load-balancing policy and a policy based on the processing capability of each service processing unit. Thus, the interface processing unit may select a service processing unit from all the service processing units corresponding to the service type of the packet according to anyone of the polling policy, random allocation policy, load-balancing policy and the policy based on the processing capability of each service processing unit.

The above embodiments describe various implementations of the packet processing apparatus in detail. Hereinafter, the detailed process of the packet processing method will be described with reference to accompanying embodiments.

The core idea of the packet processing method provided by embodiments of the present invention is as follows: configure a connection unit between the interface processing units and the service processing units in an L4~L7 network device; when receiving a packet from outside, an interface processing unit selects a service processing unit and transmits the packet to the selected service processing unit through the connection unit; the selected service processing unit performs service processing to the packet after receiving the packet.

In particular, in the embodiments of the present invention, the interface processing unit may select the service processing unit according to an indication of packet distribution policy transmitted from a service control unit in the L4~L7 network device. The indication of packet distribution policy may be generated by the service control unit according to service load information of each service processing unit obtained by the service control unit. For example, preferably, the service control unit may generate a packet distribution policy according to an overload alarm notification or a low-load notification reported by each service processing unit in real time. And the service control unit may also generate the packet distribution policy according to processing capability information of each service processing unit.

FIG. 13 is a flowchart illustrating a packet processing method according to an embodiment of the present invention. As shown in FIG. 13, in one embodiment of the present invention, the packet processing method includes the following steps:

Step 1301: a service control unit in an L4~L7 network device obtains processing capability information of each service processing unit in the packet processing apparatus.

Herein, the processing capability information of the service processing unit includes: type of services can be processed by the service processing unit and service capacity of the service processing unit, etc.

This step may be performed during the initialization of the L4~L7 network device after the L4~L7 network device starts.

Step 1302: the service control unit determines whether a processing mode configuration command is received from outside. If the processing mode configuration command is received, proceed to step 1303; otherwise, proceed to step 1306.

If a manager desires to control or adjust services processed by each service processing unit according to practical service requirements, it is possible to input the processing mode configuration command to the service control unit to trigger the service control unit proceeds with subsequent control processing on packet direction according to the requirement of the manager. If the manager does not need to control the procedure of each service processing unit, there is no need to input the processing mode configuration command to the service control unit. As such, the service control unit is triggered to perform subsequent automatic control processing on packet direction.

Step 1303: the service control unit receives from outside a processing requirement to a certain service.

Step 1304: the service control unit searches for a service processing unit meeting the processing requirement according to the processing capability information of each service processing unit.

In step 1303, as to a certain service such as video session, if the manager needs to configure a minimum bandwidth required by the video session, it is possible to input to the service control unit the processing requirement of the video session as the bandwidth of the session should be larger than a preset value. As such, in step 1304, the service control unit may search all the service processing units capable of processing the video session for a service processing unit which can provide a bandwidth not smaller than the preset value according to the processing capability information of each service processing unit.

Step 1305: the service control unit generates an indication of packet distribution policy which includes a policy to select according to a corresponding relationship between the certain service and the service processing unit searched out, proceeds to step 1307.

Step 1306: the service control unit directly generates the indication of packet distribution policy according to the processing capability information of each service processing unit.

In this step, the indication of packet distribution policy generated by the service control unit includes: service type information corresponding to each service processing unit, and anyone of polling policy, random allocation policy, load-balancing policy and the policy based on the processing capability of each service processing unit.

Step 1307: the service control unit transmits the generated indication of packet distribution policy to all the interface processing units. All the interface processing units store the indication of packet distribution policy received.

It should be noted that, through the above steps 1302 to 1307, it is realized that the service control unit transmits the indication of packet distribution policy to the interface processing units, so that all the interface processing units can obtain the packet distribution policy indication for forwarding packets. In other embodiments of the present invention, it is also possible to directly configure the packet distribution policy indication on all the interface processing units. As such, each the interface processing unit can obtain the packet distribution policy indication through its own configuration.

Step 1308: the service control unit obtains service load information of each service processing unit.

Step 1309: each service processing unit monitors service load of itself, determines whether its service load is higher than a highest load threshold or lower than a lowest load threshold set in the service processing unit. If the service load of the service processing unit is higher than the highest load threshold, proceed to step 1310. If the service load is lower than the lowest load threshold, proceed to step 1312.

Step 1310: report an overload alarm notification to the service control unit. The service control unit determines a substitute service processing unit according to the service load information of each service processing unit.

The process of the service control unit determining the substitute service processing unit may include: the service control unit searches for service processing units of the same service type with the service processing unit reporting the overload alarm notification, determines a service processing unit with a lowest load among the service processing units searched out as the substitute service processing unit.

Step 1311: the service control unit carries characteristic information of some or all sessions of the service processing unit reporting the overload alarm notification and an identifier of the substitute service processing unit in a generated switch indication, transmits the switch indication to all the interface processing units, and proceeds to step 1314.

Step 1312: report a low-load notification to the service control unit. The service control unit determines a substitute service processing unit according to the service load information of each service processing unit.

The process of the service control unit determining the substitute service processing unit may include: the service control unit searches for service processing units of the same service type with the service processing unit reporting the low-load notification, and determines the service processing unit with a lowest load among the service processing units searched out as the substitute service processing unit.

Step 1313: the service control unit carries the characteristic information of some or all sessions of the service processing unit reporting the low-load notification in an incorporation indication and transmits the incorporation indication to all the interface processing units.

Step 1314: when receiving a packet from outside, an interface processing unit, such as interface processing unit 1, determines whether the packet belongs to an established session. If the packet belongs to an established session, proceed to step 1322; otherwise, proceed to step 1315.

The process of interface processing unit 1 determining whether the packet received belongs to an established session is similar as that in the prior art, which can be described in simplicity as follows: interface processing unit 1 obtains the header of the packet, such as quintuplet information or tunnel header information of the packet, determines whether the obtained header exists in the stored session forwarding information. If the obtained header exists in the stored session forwarding information, it is determined that the packet received belongs to an established session; otherwise, it is determined the packet belongs to an unestablished session.

In addition, in this embodiment, the packet distribution policy indication may further include other processing indications required by practical services, e.g., indication of legality checking and analysis, etc. At this time, in this step, after receiving the packet from outside, interface processing unit 1 firstly performs legality checking and analysis. After the checking succeeds, interface processing unit 1 proceeds with the process of determining whether the packet belongs to an established session.

Step 1315: interface processing unit 1 determines whether the packet received is a tunnel packet. If the packet received is a tunnel packet, proceed to step 1316; otherwise, proceed to step 1317.

Step 1316: interface processing unit 1 determines whether a tunnel corresponding to the tunnel packet received is in establishment. If the tunnel corresponding to the tunnel packet received is in establishment, discard the tunnel packet; otherwise, proceed to step 1317.

In the process of steps 1315 and 1316, it has been determined that the packet received belongs to an unestablished session. Thus, if it is further determined that the packet is a tunnel packet and the tunnel is in establishment, it indicates that interface processing unit 1 receives the tunnel packet during the establishment of the tunnel and before the establishment finishes. Therefore, the packet cannot be processed and will be discarded. If the packet is not a tunnel packet, e.g. the packet is a UDP, TCP or ICMP packet, or the packet is a tunnel packet but the establishment of the tunnel has not been started yet, it indicates that the tunnel packet is used for triggering the establishment of the tunnel. Therefore, subsequent establishment processing of the session will be performed.

Step 1317: interface processing unit 1 determines whether the characteristic information of the session to which the packet received belongs is the same as that carried in the switch indication. If the characteristic information of the session to which the packet received belongs is the same as that carried in the switch indication, proceed to step 1318; otherwise, proceed to step 1319.

Step 1318: interface processing unit 1 selects the substitute service processing unit according to the identifier of the substitute service processing unit carried in the switch indication, and transmits the packet to the selected service processing unit. The selected service processing unit performs corresponding service processing to the packet and ends the procedure.

Step 1319: interface processing unit 1 determines whether the characteristic information of the session to which the packet received belongs is the same as that carried in the incorporation indication; if the characteristic information of the session to which the packet received belongs is the same as that carried in the incorporation indication, proceed to step 1320; otherwise, proceed to step 1321.

Step 1320: interface processing unit 1 selects the substitute service processing unit according to the identifier of the substitute service processing unit carried in the incorporation indication, and transmits the packet to the selected service processing unit. The selected service processing units performs corresponding service processing to the packet and ends the procedure.

Step 1321: interface processing unit 1 selects the substitute service processing unit according to the stored packet distribution policy indication, and transmits the packet to the selected service processing unit. The selected service processing unit performs corresponding service processing to the packet and ends the procedure.

Herein, if the packet distribution policy indication stored by interface processing unit 1 is received from the service control unit and includes a policy to select according to the corresponding relationship between the certain service and the service processing unit searched out, interface processing unit 1 directly selects in this step a service processing unit according to the corresponding relationship. For example, all packets of a tunnel (such as IPSec) requiring centralized processing are centralized to one service processing unit for processing. Thus, the corresponding relationship between the certain service and the service processing unit searched out in the packet distribution policy indication may be a corresponding relationship between the tunnel packet service and a certain service processing unit such as service processing unit 1. As such, in this step, if the packet received is a tunnel packet, interface processing unit 1 transmits the tunnel packet to the service processing unit 1 which is dedicated for processing tunnel packets according to the corresponding relationship.

If the packet distribution policy indication stored by interface processing unit 1 is transmitted from the service control unit and includes service type information corresponding to each service processing unit and anyone of polling policy, random allocation policy, load-balancing policy and policy based on processing capability of each service processing unit, interface processing unit 1 selects the service processing unit among all the service processing units capable of processing the service type of the packet according to anyone of the polling policy, random allocation policy, load-balancing policy and the policy based on processing capability of each service processing unit.

Step 1322: interface processing unit 1 selects the corresponding service processing unit according to the session forwarding information transmitted in advance from the service control unit, and transmits the packet to the selected service processing unit.

Herein, the process of the service control unit transmits in advance the session forwarding information to interface processing unit 1 may include: after determining that a packet received belongs to an unestablished session, a service processing unit transmit the packet to the service control unit. The service control unit performs establishment processing for the session to which the packet belongs, and transmits the session information and session processing actions to the selected service processing unit, and transmits the session forwarding information to all the interface processing units.

Step 1323: the selected service processing unit performs service processing to the received packet according to the stored session information and session processing actions.

In the above steps 1318, 1320, 1321 and 1323, the process of the service processing unit performing corresponding service processing to the received packet is similar to that in the prior art. For example, the service processing unit performs encryption/decryption processing, or responses with data content requested by the packet, or performs service switch, etc.

It should be noted that, the service control unit, each service processing unit and each interface processing unit may be in the same L4~L7 network device. Therefore, the above packet processing procedure shown in FIG. 13 may be performed in one L4~L7 network device. Thus, it is realized to flexibly select a service processing unit inside the network device, so as to improve the packet processing capability of the network device.

In addition, in the above embodiments of the present invention, the service control unit, the service processing interfaces and the interface processing units may be located in different L4~L7 network devices. Therefore, the above packet processing procedure shown in FIG. 13 may also be performed in different L4~L7 network devices. For example, the service control unit and each service processing unit shown in FIG. 13 may be located in L4~L7 network device 1, and each interface processing unit may be located in L4~L7 network device 2. Thus, through corporations of different L4~L7 network devices, flexible selection among the service processing units in different L4~L7 network devices is realized, and the packet processing capability of the network device is improved.

Regarding the packet processing apparatuses provided by embodiments of the present invention as shown in FIG. 3, FIG. 4, FIG. 8 and FIG. 9, the packet processing apparatuses include only one service control unit. Therefore, the packet processing procedure shown in FIG. 13 may be applied directly to these packet processing apparatuses.

As shown in FIG. 6, FIG. 7, FIG. 11 and FIG. 12, the packet processing apparatuses include a plurality of service control units. Therefore, each service control unit needs to perform the step of obtaining the service load information of each service processing unit in FIG. 13. And the service control unit which receives the notification transmitted by the service processing unit or the command transmitted from outside manager performs the step of generating the packet distribution policy indication and transmitting the generated packet distribution policy indication to all the interface processing units shown in FIG. 13.

According to the above embodiments of the present invention, it can be seen that, the interface processing unit in the present invention has the function of exchanging packets with outside and the function of transmitting the packets to the service processing unit according to the pre-configured policy. Therefore, the interface processing unit may be divided into an interface module and a first level pre-processing module, wherein the interface module is adapted to perform the packet transmission/receiving functions in the above embodiments of the present invention; and the first level pre-processing module is adapted to perform the function of selecting service processing unit according to the pre-configured policy and transmitting the packet to the service processing unit in the above embodiments of the present invention.

It can be seen from the above embodiments of the present invention that, the first level pre-processing module in the interface processing unit is a very important functional module. Outer traffics received by the interface are firstly processed by the first level pre-processing module. The speed of a current interface module becomes higher and higher, even reaches 40 G. Therefore, if the processing speed of the first level pre-processing module does not match the traffic transmitted by the interface module, it will become a bottleneck of wire speed processing for the whole device.

Therefore, in the packet processing apparatus provided by the embodiments of the present invention, the basic requirement to the first level pre-processing module is simple and rapid. It is known from the description of the packet processing apparatus and packet processing method in the above embodiments that, the packet forwarding of the first level pre-processing module may meet the following requirements through transmitting the packet distribution policy indication to the first level pre-processing module:

(1) Process a stream and its reverse streams and relevant streams by a same service processing unit.

(2) Centralize all data of a tunnel such as IPSec which requires centralized processing to the same service processing unit for processing.

(3) Distribute streams in a load balancing manner according to loads of the service processing units to ensure that each service processing unit has a relatively average load.

(4) Implement traffic distribution and convergence at the first level pre-processing module.

Currently, with the multiplicity of the characteristics of the service processing unit and the service control unit, there will be more and more requirements for the pre-processing module, which results in more and more special processing branches of the pre-processing module. Finally, the pre-processing module may lose the advantage of simplicity and rapidness and become a bottleneck for supporting wire speed in high-speed ports. In order to avoid this situation and ensure the process from the interface module receiving the packet to the service processing unit receiving the packet to be simple and rapid, two types of pre-processing modules may be adopted.

The first type is a pre-processing module which is applicable for common processing of most streams; the second type is a pre-processing module which performs special processing functions to some streams with special features or special streams (such as tunnel packets).

Figure 14:
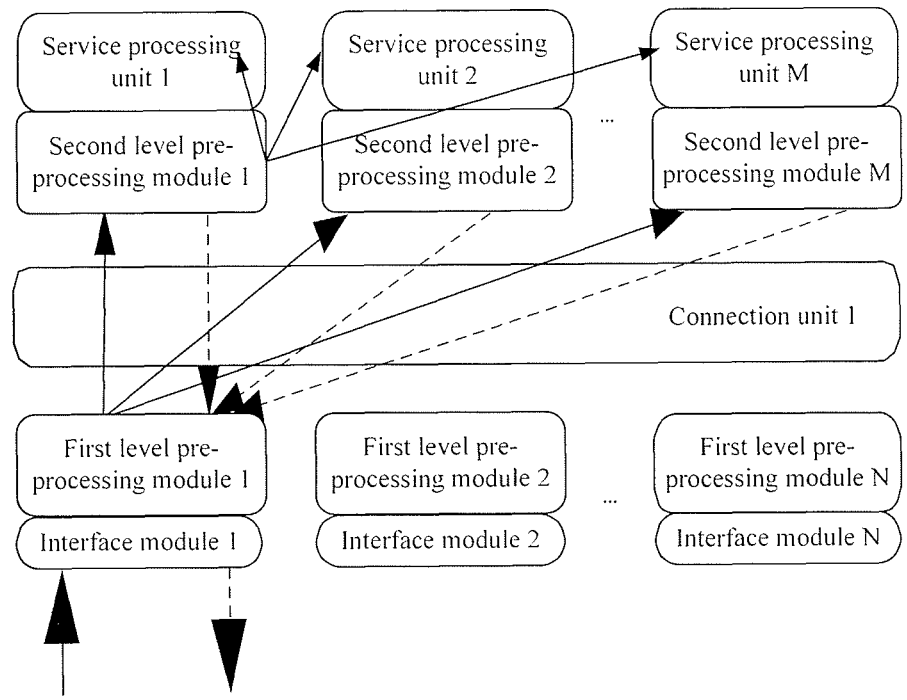
FIG. 14 is a schematic diagram illustrating a structure according to an embodiment of the present invention wherein second level pre-processing modules are added between connection unit 1 and the service processing units.

Based on the above idea of adopting two types of pre-processing modules, the two types of pre-processing modules may be preferably implemented in the packet processing apparatus of the present invention as follows:

(1) As shown in FIG. 14, add a second level pre-processing module between connection unit 1 and each service processing unit. For example, one implementation is as follows: add the second level pre-processing module on service board of each service processing unit. The first level pre-processing module in each interface processing unit only performs the common processing of most streams as described above, and the newly added second level pre-processing module is adapted to perform the second type of functions, i.e., perform the special processing to the streams with special features, i.e. perform second time distribution to the streams with special features.

Figure 15:
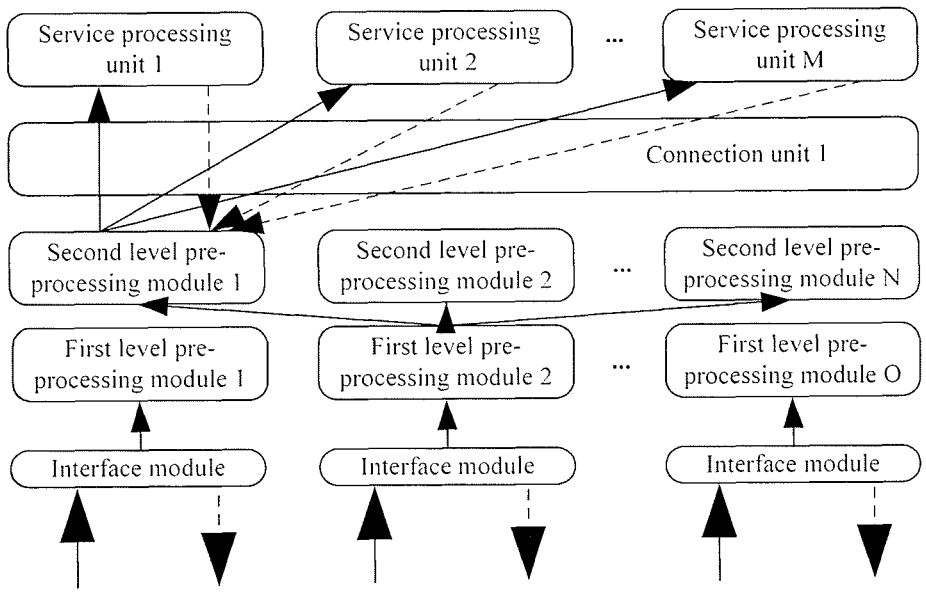
FIG. 15 is a schematic diagram illustrating an interface processing unit according to an embodiment of the present invention wherein second level pre-processing modules are added between connection unit 1 and the first level pre-processing modules.

(2) As shown in FIG. 15, add the second level pre-processing module between the first level pre-processing module and connection unit 1, the first level pre-processing module in each interface processing unit performs only the common processing functions for most streams as described above regarding the first type, and the newly added second level pre-processing module is adapted to perform the above second type functions, i.e. perform special processing to the streams with special features, i.e. perform second time distribution to the streams with special features.

The number of first level pre-processing modules may be the same as or different from that of second level pre-processing modules.

In the above method, the packets received by the interface module are further classified through a second level pre-processing module. As to a first level pre-processing module, it is only necessary to ensure the correctness of the first time distribution performed by the common processing procedure to most common streams (such as UDP/TCP/ICMP packets, etc). As to some special packet streams, the first level pre-processing module may directly transmit them to the second level pre-processing module without special recognizing and processing. The packets will be processed by the second level pre-processing module after arriving at the second level pre-processing module. The second level pre-processing module determines whether the packet stream is a given special stream, if the packet stream is a given special stream, queries a local stream table and relocates the packet stream to a correct service processing board.

Through the above layered pre-processing, the processing to the given special streams which is previously performed by the first level pre-processing module is now performed by the second level pre-processing module. Therefore, relevant items stored by the first pre-processing module for performing the above functions are no longer required. The packet distribution policy related to the streams with special features is distributed to the second level pre-processing module instead of the first level pre-processing module.

Figure 16:
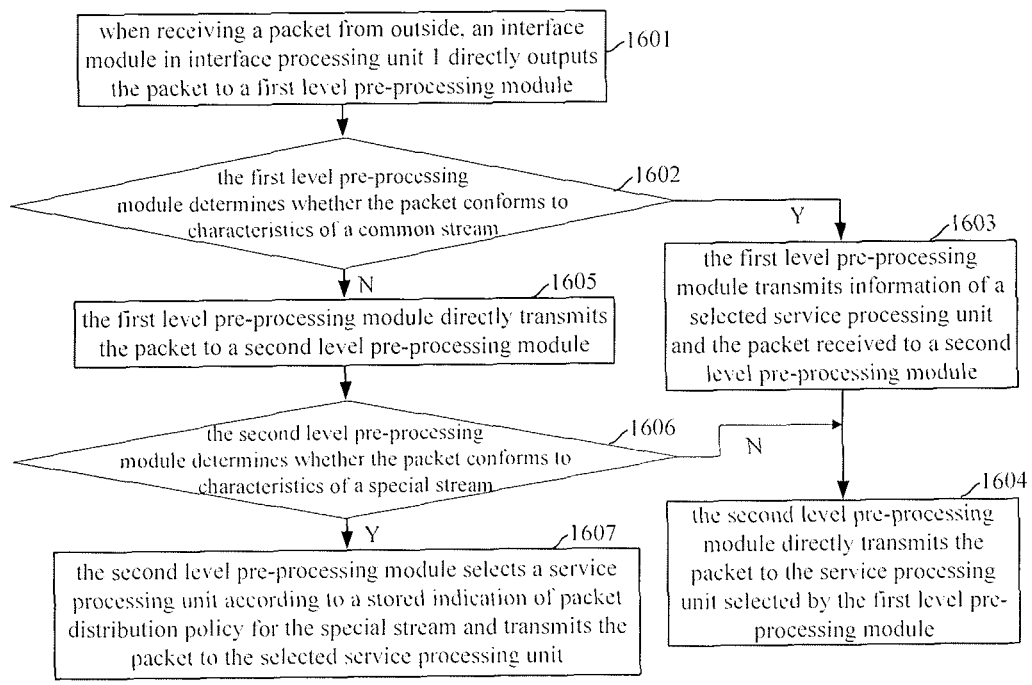
FIG. 16 is a flowchart of packet distribution processing using the first level pre-processing modules and the second pre-processing modules according to an embodiment of the present invention.

The packet distribution process adopting the first level pre-processing module and the second level pre-processing module will be described in detail hereinafter with reference to an embodiment. As shown in FIG. 16, the process includes the following steps:

Step 1601: when receiving a packet from outside, an interface module in an interface processing unit such as interface processing unit 1 directly outputs the packet to the first level pre-processing module in the interface processing module 1.

Step 1602: the first level pre-processing module in interface processing unit 1 determines whether the packet conforms to characteristics of a common stream according to the characteristic information of the common stream pre-stored. If the packet conforms to the characteristics of the common stream, proceed to step 1603; otherwise, proceed to step 1605.

Step 1603: the first level pre-processing module in interface processing unit 1 selects a service processing unit from all the service processing units, and transmits information of the selected service processing unit and the packet received to a second level pre-processing module.

The first level pre-processing module may select the service processing unit from all the service processing units according to the pre-stored indication of packet distribution policy for the common stream. The detailed selection process is similar as the process of the interface processing unit for selecting a service processing unit shown in FIG. 13.

In this step, the first level pre-processing module may select the second level pre-processing module according to a HASH algorithm or other scheduling policies and transmit the information of the selected service processing unit and the packet received to the selected second level pre-processing module.

Step 1604: the second level pre-processing module does not do anything to the packet and directly transmits the packet to the service processing unit selected by the first level pre-processing module according to the received information of the service processing unit and ends the procedure.

If the second level pre-processing module is added to the packet processing apparatus in the manner as shown in FIG. 14, in step 1603, the information of the service processing unit and the packet outputted by the first level pre-processing module are transmitted to the second level pre-processing module through connection unit 1. If the second level pre-processing module is added to the packet processing apparatus in the manner as shown in FIG. 15, in the above step 1604, the packet directly outputted by the second level pre-processing module is transmitted to the service processing unit selected by the first level pre-processing module through connection unit 1.

Step 1605: the first level pre-processing module directly transmits the packet to a second level pre-processing module.

In this step, the first level pre-processing module may select a second level pre-processing module according to a HASH algorithm or other scheduling policies and transmits the received packet to the selected second level pre-processing module.

Step 1606: after receiving the packet, the second level pre-processing module determines whether the packet conforms to pre-stored characteristics of a special stream. If the packet conforms to pre-stored characteristics of a special stream, proceed to step 1607; otherwise, proceed to step 1604.

Step 1607: the second level pre-processing module selects a service processing unit according to the stored packet distribution policy indication of the special stream and transmits the packet to the selected service processing unit.

In the above process, the characteristic information and packet distribution policy indication of the common stream pre-stored by the first level pre-processing module, and the characteristic information of the special stream and the packet distribution policy indication pre-stored by the second level pre-processing module, are both distributed by the service control unit or be configured statically by the manager. The common stream may be UDP/TCP/ICMP streams, etc.

The detailed process of step 1606 to 1607 will be described in detail hereinafter taking a tunnel packet stream as an exemplary special stream. The process includes the following steps:

Step s401, the second level pre-processing module determines whether an encapsulation format of the packet is an ex-tunnel packet; if the encapsulation format of the packet is an ex-tunnel packet, proceed to step s402; otherwise, proceed to step s403.

The process of determining whether the encapsulation format of the packet is an ex-tunnel packet is to determine whether the packet conforms to the characteristic of the special stream.

Step s402, the second level pre-processing module queries an out-direction relocation table, distributes the packet to a corresponding service processing unit which performs corresponding service processing to the packet, and ends the procedure.

The process of the second level pre-processing module querying the out-direction relocation table and distributing the packet to the corresponding service processing unit is to select the service processing unit according to the pre-stored packet distribution policy indication of the special stream and transmitting the packet.

Step s403, the second level pre-processing module searches a forwarding table according to a destination address of the packet to obtain an output interface and determines whether the packet is an in-tunnel packet according to information of the output interface. If the packet is an in-tunnel packet, proceed to step s404; otherwise, proceed to step s405.

The process of determining whether the packet is an in-tunnel packet is to determine whether the packet conforms to characteristic of the special stream.

Step s404, query an indirection relocation table, if a corresponding item is found, distribute the packet to the corresponding service processing unit according to information of the table; otherwise, discard the packet and inform the service control unit to initiate a negotiation and end the procedure.

The process of the second level pre-processing module querying the in-direction relocation table and distributing the packet to the corresponding service processing unit is to select the service processing unit according to the pre-stored packet distribution policy indication of the special stream and transmitting the packet.

Step s405, transmit the packet to the first level pre-processing module. The first level pre-processing module performs common stream distribution processing to the packet.

Through the above method provided by the embodiments of the present invention, the first level pre-processing module needs to implement only common processing for most streams. The first level pre-processing module processes the special streams such as the relevant streams born by the tunnel also according to the common procedure without any special processing. After arriving at the second level pre-processing module, the packet will be recognized and distributed for a second time. The out/in-direction relocation table required for processing special packets previously stored in the first level pre-processing module should be deleted from the first level pre-processing module and stored in all the second level pre-processing modules.

In addition, besides sharing some works of the first level pre-processing module, the second level pre-processing module may also take on new works according to practical situations. For example, if a service board where the service processing unit is located also provides, besides the service processing unit, a processing unit which performs further processing such as content searching for the packet, and if there are a plurality of such processing units, it is possible to distribute, by the second level pre-processing module, the streams after the common service processing by the first level pre-processing module to different processing units for further processing according to pre-configured policy.

It should be noted that the connection unit mentioned in the embodiments of the present invention may be implemented by anyone of switch matrix, Switch chip, bus connection unit and Full Match connection unit.

The foregoing descriptions are only preferred embodiments of this invention and are not for use in limiting the protection scope thereof. Any changes and modifications can be made by those skilled in the art without departing from the spirit of this invention and therefore should be covered within the protection scope as set by the appended claims.

The invention claimed is:

1. A packet processing apparatus, applied in an L4~L7 network device, comprising: a plurality of interface processing units and a plurality of service processing units, the interface processing units are connected with the service processing units through a first connection unit; and
   each of the interface processing units is adapted to select, after receiving a packet from outside, a service processing unit from all the service processing units and transmit the packet to the selected service processing unit through the first connection unit; and
   each of the service processing units is adapted to perform service processing to the packet after receiving the packet, wherein
   all the service processing units are connected with a service control unit through a second connection unit;
   each of the service processing units is further adapted to determine, after receiving the packet, whether the packet received belongs to an established session, transmit the packet to the service control unit through the second connection unit if the packet does not belong to an established session, and perform service processing to the packet according to stored session information and session processing actions if the packet belongs to an established session; and
   the service control unit is adapted to establish a session for the packet after receiving the packet, select a service processing unit and transmit the session information and the session processing actions to the selected service processing unit through the second connection unit.

2. The apparatus of claim 1, wherein each of the interface processing units is further adapted to determine, after determining that the packet received does not belong to an established session, whether the packet is a tunnel packet and whether a corresponding tunnel is in establishment, directly discard the packet if the packet is a tunnel packet and the corresponding tunnel is in establishment, and proceed with the operation of selecting a service control unit if the packet is not a tunnel packet or the corresponding tunnel is not in establishment.

3. The apparatus of claim 1, wherein all the service control units, the service processing units and the interface processing units are located in the same L4~L7 network device.

4. The apparatus of claim 1, wherein the service control unit is further adapted to transmit session forwarding information to the selected service processing unit;
   each of the service processing units is further adapted to transmit the received session forwarding information to all the interface processing units; and
   each of the interface processing units is adapted to store the session forwarding information received, and perform the operation of selecting a service processing unit according to the stored session forwarding information after receiving the packet from outside and after determining that the packet belongs to an established session.

5. The apparatus of claim 1, further comprising: the service control unit is connected with a plurality of service application units through a third connection unit; wherein
   the service control unit is further adapted to determine, after receiving the packet, whether the packet requires corresponding application layer processing, select a corresponding application processing unit and transmit the packet to the selected application processing unit if the packet requires application layer processing, and establish the session for the packet if the packet does not require application layer processing; and
   each of the application processing units is adapted to perform the application layer processing to the packet after receiving the packet, select a service control unit and transmit the processed packet to the selected service control unit.

6. The apparatus of claim 5, wherein all the application processing units, the service control units, the service processing units and the interface processing units are located in the same L4~L7 network device; or
   if there are a plurality of service control units, some of the interface processing units are in a first L4~L7 network device, other interface processing units are in a second L4~L7 network device; and some of the service processing units are in the first L4~L7 network device, other service processing units are in the second L4~L7 network device;
   and some of the service control units are in the first L4~L7 network device, other service control units are in the second L4~L7 network device; and some of the application processing units are in the first L4~L7 network device, other application processing units are in the second L4~L7 network device.

7. The apparatus of claim 1, wherein the connection unit is anyone of a switch matrix, a Switch chip, a bus connection unit and a Full Match connection unit.

8. The apparatus of claim 1, wherein each of the interface processing units comprises: an interface module and a first level pre-processing module; wherein
   the interface module is adapted to receive the packet from outside and output the packet to the first level pre-processing module; and
   the first level pre-processing module is adapted to perform packet pre-processing comprising selecting a service processing unit from all the service processing units and transmitting the packet to the selected service processing unit through the first connection unit.

9. The apparatus of claim 8, further comprising: a second level pre-processing module; wherein
   the first level pre-processing module is further adapted to store characteristic information of a common stream, determine whether the packet conforms to the characteristic of the common stream after receiving the packet outputted from the interface module, proceed with the operation of selecting a service processing unit for the packet from all the service processing units and trigger the second level pre-processing module and the first connection unit to transmit, according to information of the service processing unit selected by the first level pre-processing module, the packet to the service processing unit selected by the first level pre-processing module if the packet conforms to the characteristic of the common stream, and directly output the packet to the second level pre-processing module if the packet does not conform to the characteristic of the common stream; and the second level pre-processing module is adapted to select, after receiving the packet, a service processing unit according to a stored indication of packet distribution policy for special stream if the packet conforms to characteristic information of a special stream stored by the second level pre-processing module, and transmit the packet to the selected service processing unit.

10. The apparatus of claim 9, wherein the second level pre-processing module is located between the first level pre-processing module and the first connection unit; or the second level pre-processing module is located between the first connection unit and each service processing unit.

11. The apparatus of claim 9, wherein there is only one second level pre-processing module; or there are more than one second level pre-processing modules, and the first level pre-processing module is adapted to transmit the packet to a second level pre-processing module selected according to HASH algorithm or other pre-stored scheduling policies.

* * * * *